(12) United States Patent
Zhao et al.

(10) Patent No.: US 10,294,602 B2
(45) Date of Patent: May 21, 2019

(54) WASHING MACHINE FOOT WITH AUTOMATIC LEVELING FUNCTION AND A WASHING MACHINE

(71) Applicants: QINGDAO HAIER WASHING MACHINE CO., LTD., Laoshan District, Qingdao, Shandong (CN); QINGDAO HAIER SMART TECHNOLOGY R&D CO., LTD., Laoshan District, Qingdao, Shandong (CN)

(72) Inventors: Zhiqiang Zhao, Shandong (CN); Sheng Xu, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/558,342

(22) PCT Filed: Dec. 28, 2016

(86) PCT No.: PCT/CN2016/112601
§ 371 (c)(1),
(2) Date: Sep. 14, 2017

(87) PCT Pub. No.: WO2018/032689
PCT Pub. Date: Feb. 22, 2018

(65) Prior Publication Data
US 2018/0274165 A1 Sep. 27, 2018

(30) Foreign Application Priority Data
Aug. 16, 2016 (CN) .......................... 2016 1 0675665

(51) Int. Cl.
*A47B 91/16* (2006.01)
*D06F 39/12* (2006.01)
(Continued)

(52) U.S. Cl.
CPC ............ *D06F 39/125* (2013.01); *D06F 39/12* (2013.01); *F16F 9/165* (2013.01); *F16F 15/366* (2013.01); *F16M 7/00* (2013.01)

(58) Field of Classification Search
USPC ... 248/550, 188, 188.1, 188.2, 188.3, 188.5, 248/188.8; 188/151 R
See application file for complete search history.

(56) References Cited

U.S. PATENT DOCUMENTS 2,635,838 A * 4/1953 Branson ................ F16F 15/023
188/298
3,388,883 A * 6/1968 Wossner .................. A47B 9/10
188/300
(Continued)

FOREIGN PATENT DOCUMENTS

CN 101023239 A 8/2007
CN 201151829 Y 11/2008
(Continued)

*Primary Examiner* — Terrell L McKinnon
*Assistant Examiner* — Michael McDuffie
(74) *Attorney, Agent, or Firm* — Buchanan Ingersoll & Rooney PC

(57) ABSTRACT

A washing machine foot with automatic leveling function comprises: a jacket; an adjusting foot, which is arranged in the jacket and moves axially relative to the jacket; and a flexible assembly, which is arranged in the adjusting foot and is used for accommodating a hydraulic medium; one end of the flexible assembly is mounted in the jacket in a limiting manner, and another end of the flexible assembly is a telescopic end acting on the adjusting foot; and the telescopic end of the flexible assembly extends and contracts under action of the hydraulic medium to drive the adjusting (Continued)

B-B foot to move axially, thereby implementing automatic leveling. According to the hydraulic principle, the washing machine foot is provided with the hydraulic medium, the washing machine feet can automatically adjust adaptively for different pressures due to the fluidity of the hydraulic medium.

19 Claims, 5 Drawing Sheets

(51) Int. Cl.
*F16M 7/00* (2006.01)
*F16F 9/16* (2006.01)
*F16F 15/36* (2006.01)

(56) References Cited

U.S. PATENT DOCUMENTS

| | | | | |
|---|---|---|---|---|
| 3,768,766 | A * | 10/1973 | Bain | A47B 91/16 248/188.2 |
| 4,625,424 | A * | 12/1986 | de la Haye | G12B 5/00 248/649 |
| 4,632,228 | A * | 12/1986 | Oster | F16F 9/56 188/282.1 |
| 6,009,815 | A * | 1/2000 | Hartman | A47B 91/02 108/147 |
| 8,104,724 | B2 * | 1/2012 | Sorohan | A47B 91/16 248/188.3 |
| 8,302,743 | B2 | 11/2012 | Pike et al. | |
| 8,689,706 | B2 * | 4/2014 | Gompper | F16B 12/44 108/158.11 |
| 9,909,709 | B2 * | 3/2018 | Pike | A47B 91/10 |
| 2003/0193000 | A1 * | 10/2003 | Leveridge | E06C 7/44 248/188.2 |
| 2006/0180720 | A1 * | 8/2006 | Cournoyer | A47B 91/02 248/188.2 |
| 2007/0023591 | A1 * | 2/2007 | Kwon | D06F 39/125 248/188.3 |
| 2010/0224745 | A1 * | 9/2010 | Orlov | F16M 7/00 248/188.3 |
| 2012/0193503 | A1 * | 8/2012 | Pike | A47B 91/16 248/560 |
| 2016/0025261 | A1 | 1/2016 | Pike et al. | |
| 2016/0088930 | A1 * | 3/2016 | Hansen | F16F 9/0245 108/147 |

FOREIGN PATENT DOCUMENTS

CN 101864891 A 10/2010
CN 102858204 A 1/2013

* cited by examiner

WASHING MACHINE FOOT WITH AUTOMATIC LEVELING FUNCTION AND A WASHING MACHINE

TECHNICAL FIELD

The present invention relates to the technical field of washing machine, and particularly relates to washing machine foot with automatic leveling function and a washing machine.

BACKGROUND

A household appliance is generally provided with a leveling device at the bottom of its casing. During placement of the household appliance, the leveling device is adjusted to make the household appliance stably placed. After the household appliance is leveled, the leveling device can support the household appliance to keep the household appliance stable.

Taking a washing machine for example, the existing washing machine is usually provided with bolt feet mounted at the bottom of its casing or the whole machine. Each bolt foot comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt feet into different lengths of the screw holes of the base plate. Mostly, the height of the washing machine is increased if the feet of the washing machine rotate counterclockwise, and the height of the washing machine is reduced if the feet of the washing machine rotate clockwise. After the height adjustment of the bolt feet is completed, the nut washers for preventing loosening are tightened to keep the washing machine stable.

Although said bolt feet of the washing machine implement the leveling of the washing machine, a user still needs to carry out manual adjustment. If the washing machine has a relatively large self weight or a placement space for the washing machine is narrow, it is very inconvenient to operate for user. Additionally, vibration of the washing machine in a long-term working process also act on the leveling feet and causes support failure of the feet, resulting in unlevel placement of the washing machine.

For example, an existing 80 KG drum washing machine generally has a weight of about 80 KG, which is relatively heavy, so its height adjustment is very inconvenient for users. Even though the height adjustment is completed, it cannot be ensured that the washing machine is adjusted to an optimal state. When the washing machine works, especially accelerates from 0 r/min to about 1400 r/min for drying, large vibration will occur if the washing machine is placed unlevel or has a weak leg problem, which greatly influences use comfortableness of the user.

In addition, the vibration of the unlevel washing machine may cause loosening of foot screws, which result in vertical movement of a foot bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present invention is proposed.

SUMMARY

To solve the problems described above, a first object of the present invention is to provide washing machine foot with automatic leveling function. Specifically, a technical solution adopted by the present invention is as follows:

Washing machine foot with automatic leveling function comprises:

a jacket;

an adjusting foot, which is arranged in the jacket and moves axially relative to the jacket;

and a flexible assembly, which is arranged in the adjusting foot and is used for accommodating a hydraulic medium;

one end of the flexible assembly is mounted in the jacket in a limiting manner, and another end of the flexible assembly is a telescopic end acting on the adjusting foot;

and the telescopic end of the flexible assembly extends and contracts under action of the hydraulic medium to drive the adjusting foot to move axially, thereby implementing automatic leveling.

Further, the jacket comprises a jacket body with a hollow passage, the adjusting foot is arranged in the hollow passage of the jacket body in an axially slidable manner, and one end of the adjusting foot extends out of the hollow passage of the jacket body;

one end of the jacket body is opened and flanges outwards an outer side of the hollow passage to form a jacket plane, and the jacket plane fits to a base plate of the washing machine and is fixedly connected with the base plate through connectors.

Further, the flexible assembly comprises an oil press plate, a press plate and an oil bag, and an opening of the oil bag is in sealed connection with a lower wall of the oil press plate through the press plate;

an oil nipple is arranged on one side of the oil press plate, an oil hole for allowing the hydraulic medium in the oil bag to flow in is formed in the lower wall of the oil press plate, and an oil passage for communicating the oil nipple with the oil holes is formed in the oil press plate;

the oil press plate is mounted at one end of the jacket plane of the jacket body in a limiting manner, and the oil bag is arranged in the jacket and comes into contact with an inner wall of the jacket.

Further, the flexible assembly further comprises a limiting plate, the limiting plate comprises a plurality of protruded limiting claws, and limiting grooves matching with the limiting claws to implement limiting are formed in the jacket body;

and the limiting plate, the oil press plate and the press plate are fixedly connected to limit the circumferential rotation of the flexible assembly in the adjusting foot.

Further, the oil bag comprises a corrugated structure capable of stretch, a throttling narrow neck and an opening, the throttling narrow neck communicates with the corrugated structure, and the opening is located at an end of the throttling narrow neck;

the flexible assembly further comprises an upper protection ring, a mounting hole for allowing the throttling narrow neck to pass is formed in a center of the upper protection ring, a mounting groove is formed in the upper protection ring, one end of the mounting groove is opened and across the mounting hole, and another end of the mounting groove is opened in a side wall of the upper protection ring;

and the throttling narrow neck goes into the mounting hole through the mounting groove.

Further, further comprising, an axial limiting device, wherein the axial limiting device is arranged in the jacket, one side of the axial limiting device is limited by the base plate of the washing machine, and another side acts on the flexible assembly for limiting an axial movement of the flexible assembly.

Further, the axial limiting device is a circlip with an annular shape and a gap, a ring groove is formed in the inner wall of the jacket, and the circlip is clamped in the ring groove and is located above the limiting plate of the flexible assembly.

Further, a limiting bulge is arranged on the upper surface of the circlip in a protrusion manner, and a hole for allowing operations of a tool is formed in the circlip.

Further, a guide limiting groove is formed in the inner wall of the jacket, a guide limiting block is arranged on an outer wall of the adjusting foot, and the guide limiting block is limited in the guide limiting groove and axially slide along the guide limiting groove;

an elastic washer is arranged on the outer side of a bottom wall of the jacket, a reinforcing fitting groove is formed in the bottom wall of the jacket, a reinforcing fitting ribs matching with the reinforcing fitting groove is arranged on an upper surface of the elastic washer, and a lower surface of the elastic washer is partially recessed to form a damping rib.

A second object of the present invention is to provide a washing machine. Specifically, a technical solution adopted by the present invention is as follows:

A washing machine having the washing machine foot with automatic leveling function comprises a casing, a plurality of the washing machine feet mounted at a bottom of the casing, and a hydraulic medium provided inside the washing machine feet flowing between the washing machine feet to implement leveling.

According to the hydraulic principle, the washing machine foot with automatic leveling function in the present invention, the washing machine foot is provided with the hydraulic medium, and the washing machine foot can automatically adjust adaptively for different pressures due to the fluidity of the hydraulic medium.

In the washing machine foot with automatic leveling function in the present invention, the hydraulic medium is contained in the sealed flexible assembly, and the flexible assembly is arranged inside the adjusting foot to effectively solve the problem of the leakage of the hydraulic medium and ensure the stability of the work of the washing machine foot.

In the washing machine foot with automatic leveling function in the present invention, the flexible assembly is mounted in the jacket in a limiting manner, to prevent the flexible assembly from being damaged, so that working stability of the flexible assembly can be ensured.

In addition, the washing machine foot with automatic leveling function in the present invention, has a high assembly efficiency and is simple and convenient, and a stress part (such as the jacket) can be made of sheet metal, or manufactured by zinc alloy casting, or manufactured by injection molding from high-performance engineering plastic, such as PPS, PI, PEEK and the like, so that the stress part has high reliability.

Therefore, the washing machine foot of the present invention has a simple structure and low cost; it is easy to use and has high reliability; it can remarkably reduce vibration, reduce noise, and improve the comfort of the user experience of the washing machine.

REFERENCE SIGNS

Figure 1:
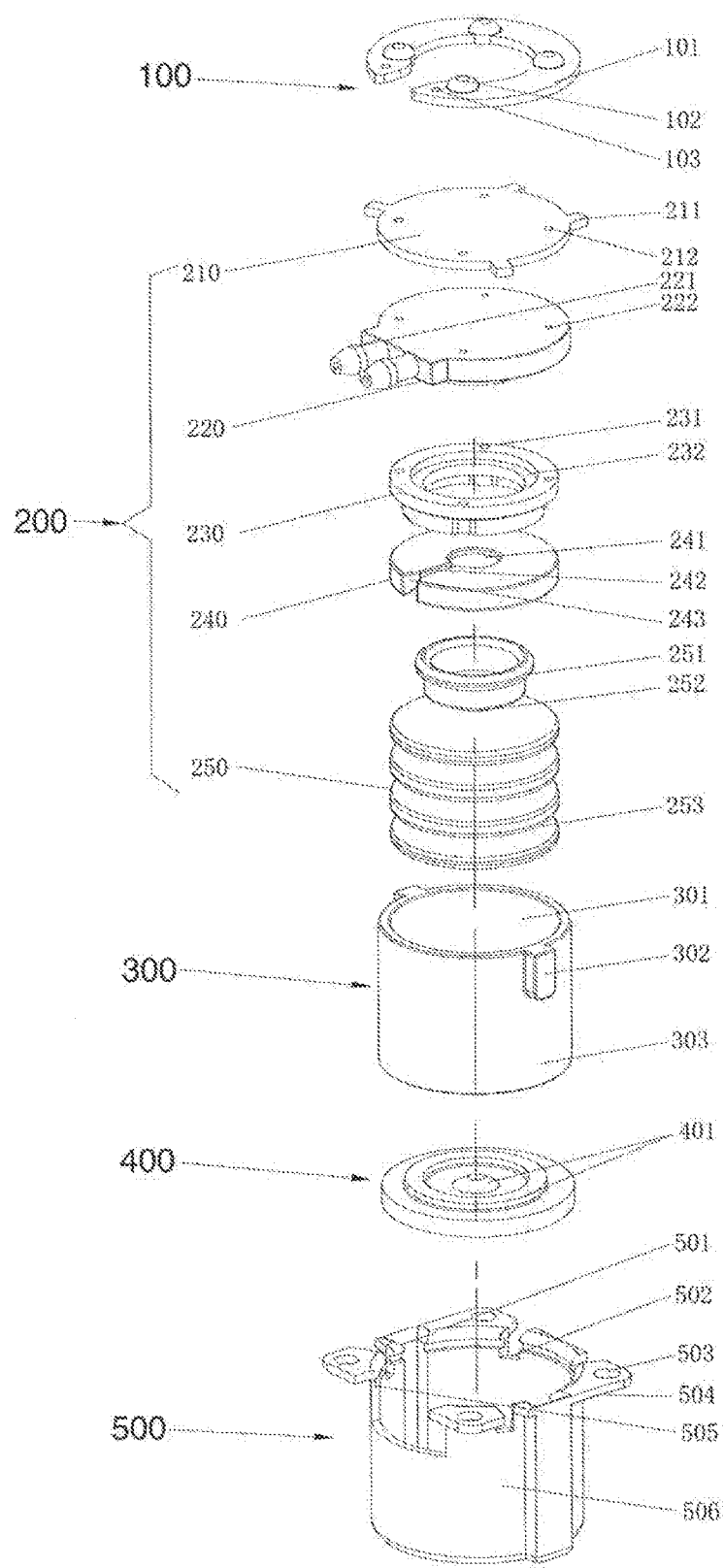
FIG. 1 is a first exploded view of a washing machine foot with an automatic leveling function according to an embodiment of the present invention.
Figure 2:
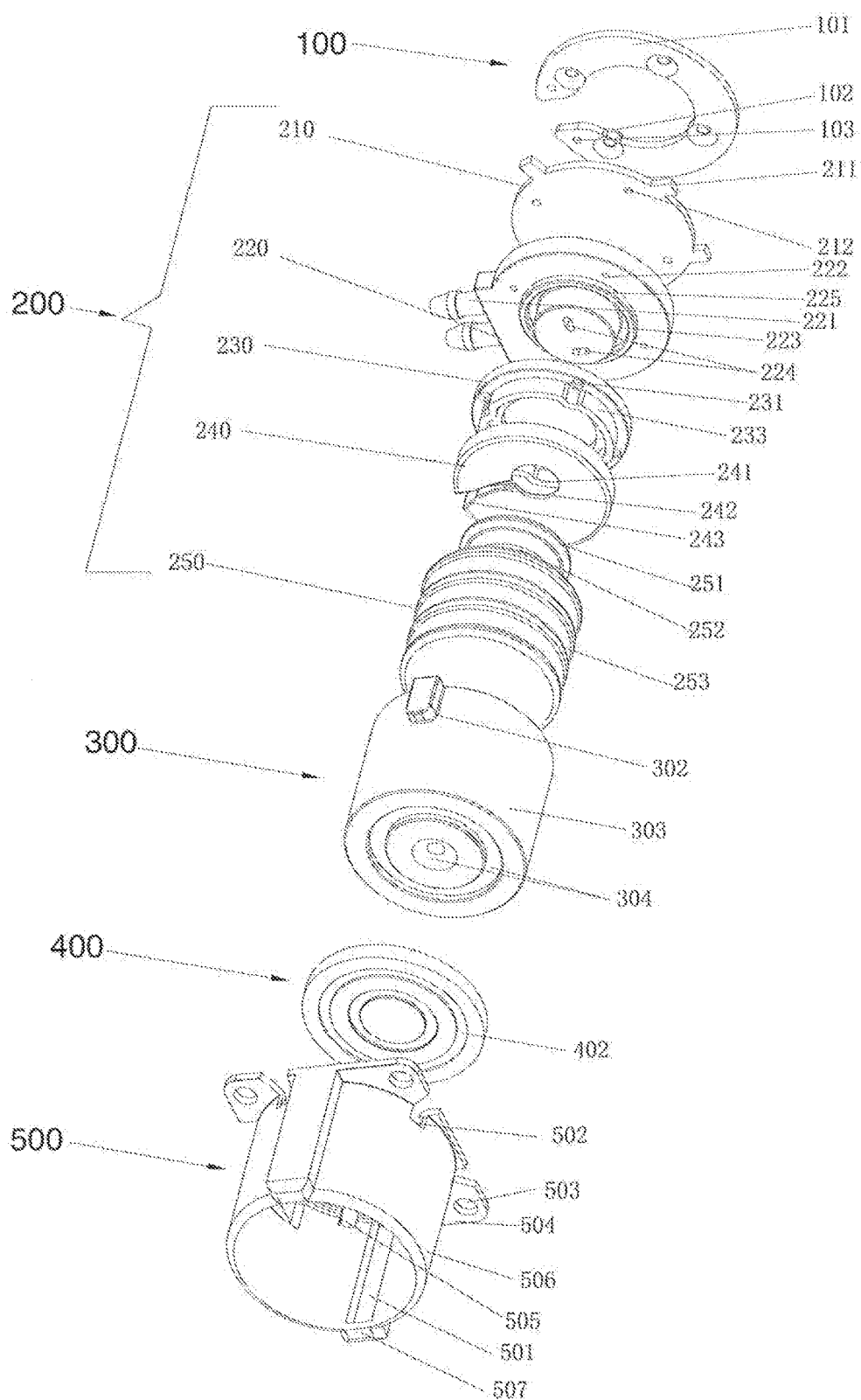
FIG. 2 is a second exploded view of a washing machine foot with an automatic leveling function according to an embodiment of the present invention.
Figure 3:
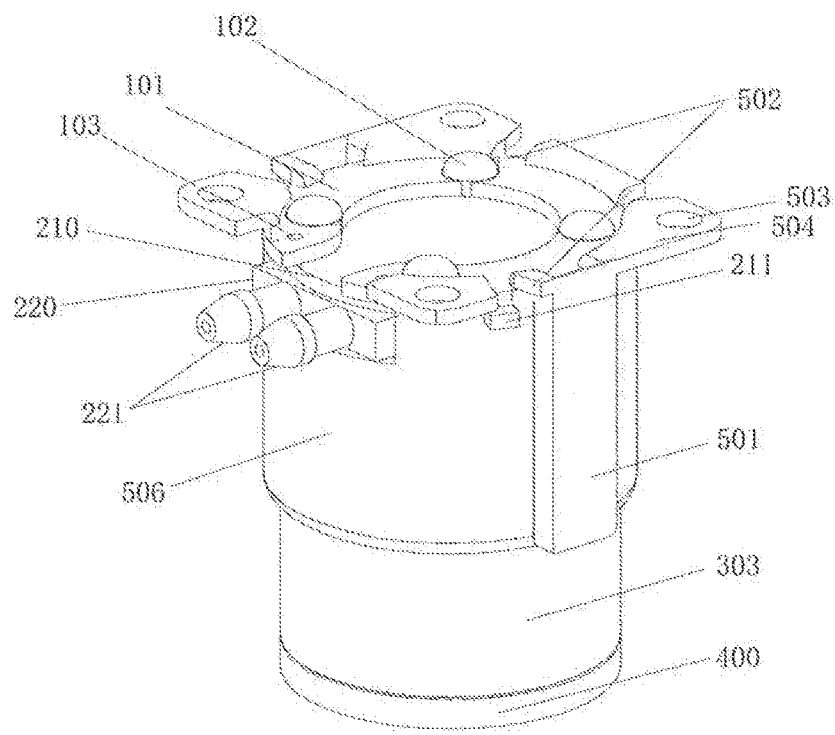
FIG. 3 is a stereoscopic schematic diagram of a washing machine foot with an automatic leveling function according to an embodiment of the present invention.
Figure 4:
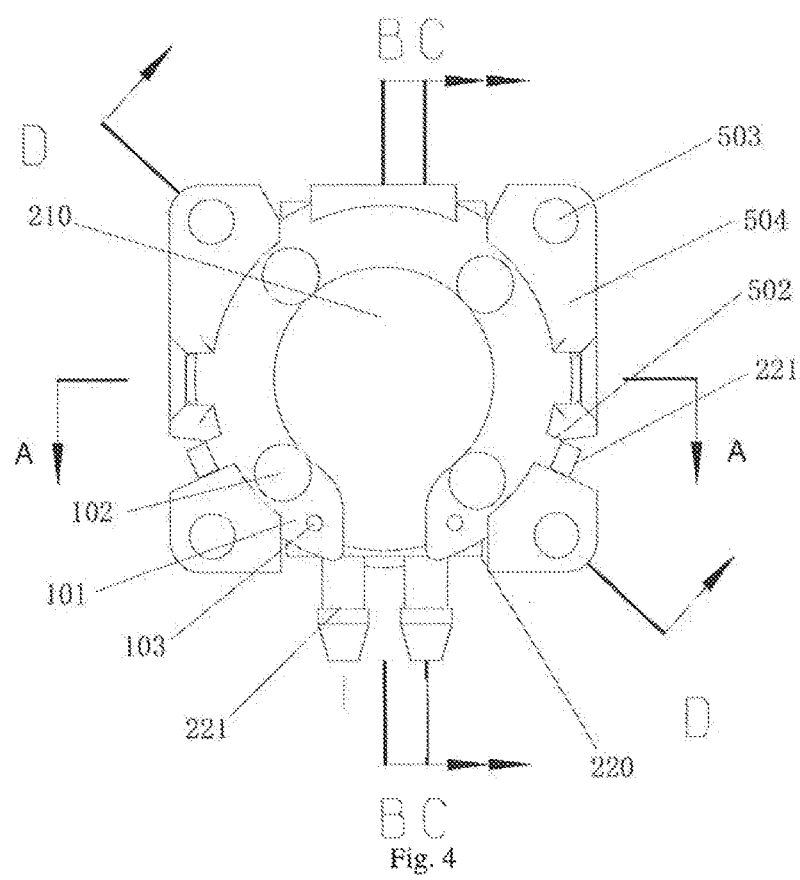
FIG. 4 is a top view of a washing machine foot with an automatic leveling function according to an embodiment of the present invention.
Figure 5:
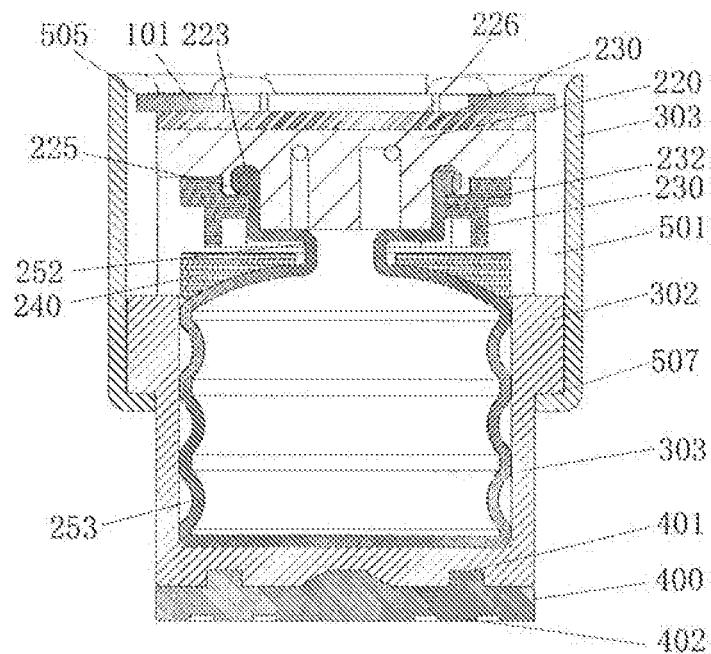
FIG. 5 is a section view of the washing machine foot with an automatic leveling function according to the embodiment of the present invention taken along section A-A in FIG. 4.
Figure 6:
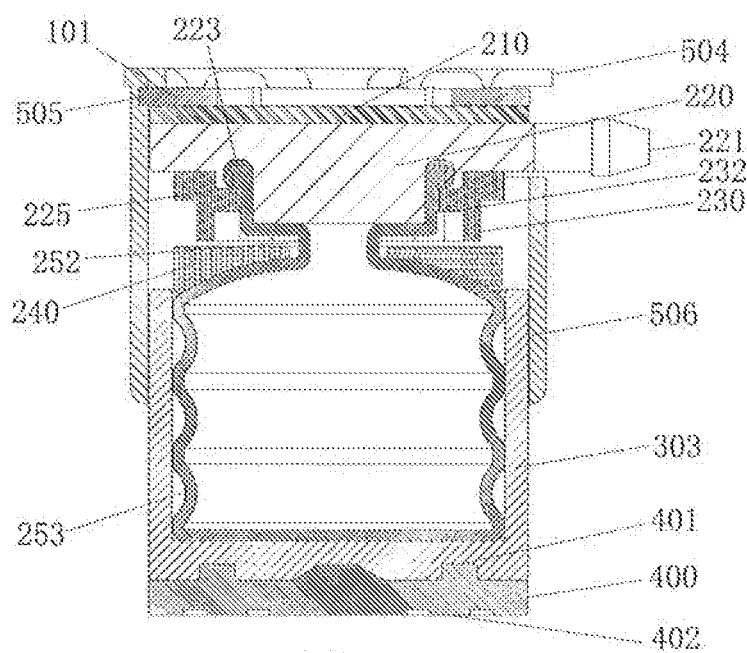
FIG. 6 is a section view of the washing machine foot with an automatic leveling function according to the embodiment of the present invention taken along section B-B in FIG. 4.
Figure 7:
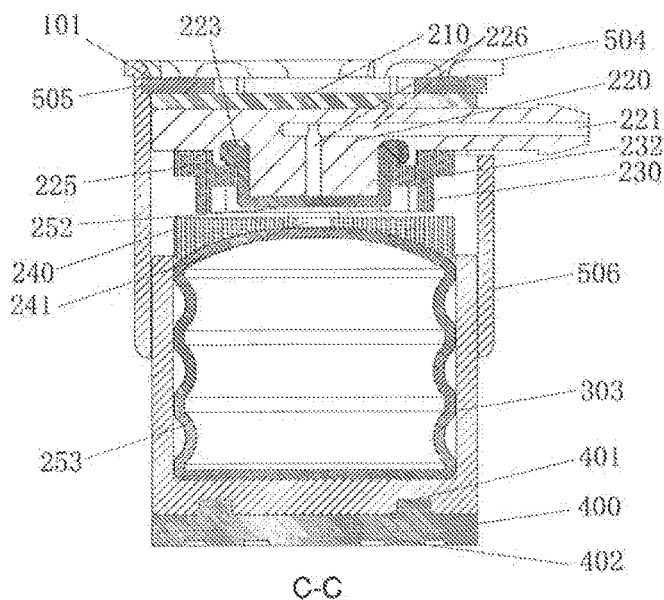
FIG. 7 is a section view of the washing machine foot with an automatic leveling function according to the embodiment of the present invention taken along section C-C in FIG. 4.
Figure 8:
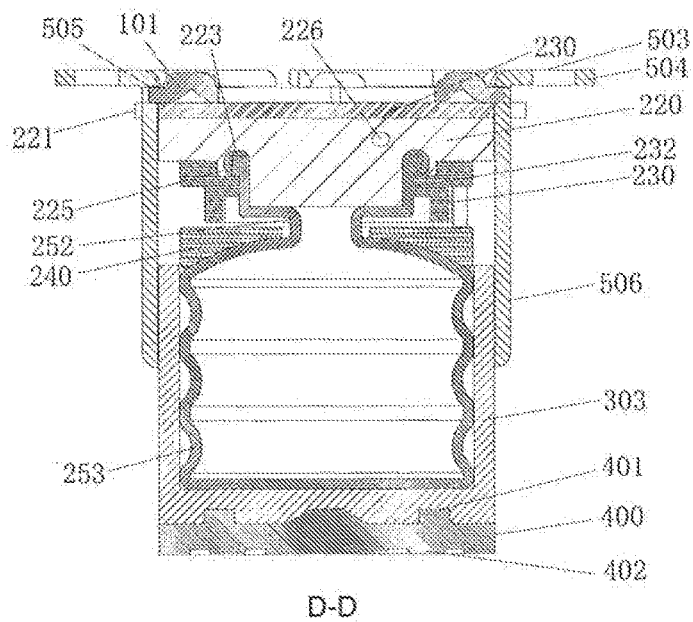
FIG. 8 is a section view of the washing machine foot with an automatic leveling function according to the embodiment of the present invention taken along section D-D in FIG. 4.

100—axial limiting device; 101—circlip; 102—limiting bulge; 103—hole; 200—flexible assembly; 210—limiting plate; 211—limiting claw; 212—limiting plate mounting hole; 220—oil press plate; 221—oil nipple; 222—oil press plate mounting hole; 223—sealing groove; 224—oil hole; 225—sealing rib; 226—oil passage; 230—press plate; 231—press plate mounting hole; 232—sealing press-fit step; 233—press plate lower ring; 240—upper protection ring; 241—mounting hole; 242—mounting groove; 243—chamfer structure; 250—oil bag; 251—opening; 252—throttling narrow neck; 253—corrugated structure; 300—adjusting foot; 301—hollow chamber; 302—guide limiting block; 303—cylinder body; 400—elastic washer; 401—reinforcing fitting rib; 402—damping rib; 500—jacket; 501—guide limiting groove; 502—limiting groove; 503—jacket fixing hole; 504—jacket plane; 505—ring groove; 506—jacket body; 507—stopping part; 600—ground; 601—ground pit; 700—high-pressure oil pipe; 800—washing machine foot.

DETAILED DESCRIPTION

The washing machine foot with automatic leveling function and the washing machine in the present invention will be described in detail as follows with reference to the accompanying drawings:

As shown in FIG. 1 to FIG. 8, in this embodiment, a washing machine foot with automatic leveling function comprises:

a jacket 500;

an adjusting foot 300, which is arranged in the jacket 300 and can move axially relative to the jacket 300;

and a flexible assembly 200, which is arranged in the adjusting foot 300 and is used for accommodating a hydraulic medium, one end of the flexible assembly 200 is mounted in the jacket 500 in a limiting manner, and the other end of the flexible assembly 200 is an end capable of extension and contraction and acts on the adjusting foot 300;

and the end capable of extension and contraction of the flexible assembly 200 extends and contracts under action of the hydraulic medium to drive the adjusting foot 300 to move axially, thereby implementing automatic leveling.

In this embodiment, at least four washing machine feet are respectively arranged at four corners of a base plate of the washing machine, or are uniformly arranged in a circumference direction of the base plate. At least two of the washing machine feet communicate with each other. When the ground where the washing machine is placed is uneven, stresses on all washing machine feet are different, the hydraulic medium in the communicating washing machine feet flows from the washing machine foot under a larger stress to another washing machine foot under a smaller stress. As the hydraulic medium flows, the flexible assemblies 200) extend and contract to drive the adjusting feet 300 to move axially, thereby implementing the automatic leveling.

In this embodiment, the washing machine feet communicate with each other, so that the hydraulic medium inside the washing machine feet flows between the washing machine feet. When one of the washing machine feet is compressed under pressure, the hydraulic medium flows into the other washing machine foot communicating with the afore-mentioned washing machine foot. The amount of the hydraulic medium in the other washing machine foot is increased, and an increase of pressure drives the other washing machine foot to extend out, thereby ensuring a sufficient supporting force.

In this embodiment, in the washing machine foot with automatic leveling function, the flexible assembly 200 is mounted in the jacket 500 in a limiting manner in order to prevent the flexible assembly 200 from being damaged, so that working stability of the flexible assembly 200 can be ensured.

In addition, in the embodiment, the assembly of the washing machine foot with automatic leveling function has high efficiency and is simple and convenient, and a part (such as the jacket 500) being subject to stress can be made of sheet metal, or manufactured by zinc alloy casting, or manufactured by injection molding from high-performance engineering plastic, such as PPS, PI, PEEK and the like, so that the part has high reliability.

In this embodiment, the washing machine foot with automatic leveling function provides an optimal structure, which is simple to be assembled, is convenient to be mounted, and prevents the flexible assembly 200 from being damaged as possible, thereby ensuring the overall stability of the washing machine foot and prolonging the service life.

Specifically, in this embodiment, the jacket 500 comprises a jacket body 506 with a hollow passage, the adjusting foot 300 can be arranged in the hollow passage of the jacket body 506 in an axially slidable manner. One end of the adjusting foot 300 extends out of the hollow passage of the jacket body 506 and comes into contact with the ground, and the adjusting foot 300 can axially slide under action of the hydraulic medium according to the height of the ground to implement automatic leveling.

In this embodiment, one end of the jacket body 506 is opened and carried out flanging towards an outer side of the hollow passage to form a jacket plane 504, and the jacket plane 504 fits to the base plate of the washing machine and is fixedly connected with the base plate through a connector.

In this embodiment, the jacket body 506 is fixedly mounted on the base plate of the washing machine through the jacket plane 504, and the flexible assembly 200 is arranged in the jacket body 500. So the jacket 500 and the base plate interact with each other, and the flexible assembly 200 does not bear an acting force of the washing machine and extends and contracts only under the action of the hydraulic medium, thereby ensuring the working stability.

In this embodiment, the jacket body 506 has a cylinder structure, has a certain length to match with the adjusting foot 300, and at least covers a part of the adjusting foot 300.

In this embodiment, the upper part of the jacket body 506 has a flanging structure formed by one-piece pressing to form the jacket plane 504. Jacket fixing holes 503 are formed in the jacket plane 504 so as to firmly fix the jacket 500 and even the whole washing machine foot onto the base plate of the washing machine through screws or bolts.

Preferably, in this embodiment, the jacket 500 can be manufactured by plastic one-piece injection molding, aluminum alloy die casting, etc., preferably sheet metal pressing.

In this embodiment, the flexible assembly 200 comprises an oil press plate 220, a press plate 230 and an oil bag 250, and an opening of the oil bag 250 is in sealed connection with a lower wall of the oil press plate 220 through the press plate 230.

In this embodiment, oil nipples 221 are arranged on one side of the oil press plate 220. Oil holes 224 for allowing the hydraulic medium in the oil bag 250 to flow in are formed in the lower wall of the oil press plate 220, and an oil passage 226 for communicating the oil nipples 221 with the oil holes 224 is formed in the oil press plate 220.

In this embodiment, the oil press plate 220 is mounted at one end of the jacket plane 504 of the jacket body 506 in a limiting manner, and the oil bag 205 is arranged in the jacket 500 and comes into contact with an inner wall of the jacket 500.

In this embodiment, the oil press plate 220 is a component manufactured by one-piece injection molding or die-casting molding, and at least two oil nipples 221 are arranged on the oil press plate 220 and are used for communicating the washing machine feet, so that the hydraulic medium flows between the washing machine feet.

In this embodiment, the oil holes 224 are formed in the center of the oil press plate 220, and the oil passage 226 is formed in the oil press plate 220 to ensure that the hydraulic medium in the oil bag 250 can flow to the oil nipples 221 from the oil holes 224 through the oil passage 226, thereby implementing free flowing of the hydraulic medium of the multiple washing machine feet according to the size of pressure, and implementing the automatic leveling.

In this embodiment, the oil bag 250 is provided with the hydraulic medium, the oil press plate 220 is used for sealing the hydraulic medium in the oil bag 250 and enabling the hydraulic medium in the oil bag 250 to flow in/out through the oil nipples 221 of the oil press plate 220. The press plate 230 is used for ensuring a sealed connection between the opening of the oil bag 250 and the oil press plate 220, to avoid leakage of the hydraulic medium.

In this embodiment, the oil bag 250 of the flexible assembly 200 is a stretchable structure made from a flexible material, and preferably the flexible material has elasticity and can restore from deformation. Additionally, the oil press plate 220 is a component manufactured by one-piece injecting molding or die-casting molding. Therefore, as long as the oil press plate 220 is mounted in the jacket body 506 in a limiting manner, limiting mounting of the flexible assembly 200 can be implemented.

In this embodiment, the limiting mounting of the flexible assembly 200 is carried out, which mainly needs to limit a circumferential rotation movement and an axial vertical fluctuation of the flexible assembly 200. In order to limit the circumferential rotation movement of the flexible assembly 200, the following is comprised.

In this embodiment, the flexible assembly 200 further comprises a limiting plate 210. The limiting plate 210 comprises a plurality of protruded limiting claws 211, and limiting grooves 502 matching with the limiting claws 211 to implement limiting are formed in the jacket body 506. The limiting plate 210, the oil press plate 220 and the press plate 230 are fixedly connected, to limit the circumferential rotation of the flexible assembly 200 in the adjusting foot 300.

In the flexible assembly 200 of this embodiment, the limiting claws 211 of the limiting plate 210 cooperate with the limiting grooves 502 of the jacket body 506, so that the flexible assembly 200 cannot carry out the circumferential rotation.

In this embodiment, the limiting plate 210 comprises a plurality of the limiting claws 211 which are set according to the specific structure and the mounting of the oil press plate 220.

Specifically, an opening for allowing extension of the oil nipple 221 of the oil press plate 220 is formed in the jacket body 506, so that a position where the opening is located should be taken into consideration to be avoided the opening, in order to ensure the limiting mounting when the limiting claws 211 are arranged.

In this embodiment, limiting plate mounting holes 212 are formed in the limiting plate 210, oil press plate mounting holes 222 are formed in the oil press plate 220, press plate mounting holes 231 are formed in the press plate 230. The press plate 230, the oil press plate 220 and the limiting plate 210 can be tightly fixed together through screws or bolts.

In this embodiment, the jacket 500 is mounted on the base plate of the washing machine. The oil press plate 220 is fastened to the limiting plate 210, the upper part and the lower part of the limiting plate 210 are both limited. The lower part of the limiting plate 210 is lowest ends of the limiting grooves 502 of the jacket 500, and the limiting claws 211 and the limiting grooves 502 at least provide stress supporting points for the limiting plate 210 along the circumference direction, that is, the limiting claws 211 and the limiting grooves 502 are distributed along the circumference direction as uniform as possible.

Preferably, the limiting plate 210 is manufactured by sheet metal pressing, which is simple and low in cost.

In this embodiment, in order to limit the circumferential rotation movement of the flexible assembly 200, specifically:

the washing machine foot in the embodiment further comprises an axial limiting device 100, wherein the axial limiting device 100 is arranged in the jacket 500. One side of the axial limiting device 100 is limited by the base plate of the washing machine, and the other side acts on the flexible assembly 200 and is used for limiting the axial movement of the flexible assembly 200.

In this embodiment, the axial movement of the flexible assembly 200 is limited by the axial limiting device, thereby ensuring that the flexible assembly 200 stably works.

As a preferred implementation mode of this embodiment, the axial limiting device is an annular circlip 101 with a gap, a ring groove 505 is formed in an inner wall of the jacket 500, and the circlip 101 is clamped in the ring groove 505 and is located above the limiting plate 210 of the flexible assembly 200. The use of the circlip 101 provides simplicity and convenience in mounting and detaching, and costs are low. The ring groove 505 formed in the inner wall of the jacket 500 can effectively limit the circlip 101 to ensure mounting stability of the circlip 101.

In this embodiment, the ring groove 505 is formed in the inner circumference of the jacket 500 and can be manufactured by pressing, and preferably by machining. After the limiting plate 210 is mounted in the jacket 200, the circlip 101 is mounted in the upper part. After the circlip 101 is mounted, the limiting plate 210 does not move up and down any longer.

Further, in this embodiment, limiting bulges 102 are arranged on the upper surface of the circlip 101 in a protrusion manner, and the bulges 102 can further exert an axial limiting function when the circlip 101 fluctuates axially. The circlip 101 is under a uniform stress due to the limiting bulges 102.

Further, in this embodiment, holes 103 for allowing operations of a tool are formed in the circlip 101. The holes 103 in the circlip 101 facilitate mounting by the tool.

In this embodiment, the oil bag 250 comprises a corrugated structure 253 capable of extension and contraction, a throttling narrow neck 252 and an opening 251, the throttling narrow neck 252 communicates with the corrugated structure 253, and the opening 251 is located at an end of the throttling narrow neck 252.

The flexible assembly 200 further comprises an upper protection ring 240. A mounting hole 241 for allowing the throttling narrow neck 252 to pass is formed in the center of the upper protection ring 240, and a mounting groove 242 is formed in the upper protection ring 240. One end of the mounting groove 242 is opened and penetrates through the mounting hole 241, and the other end of the mounting groove 242 is opened in a side wall of the upper protection ring 240.

The throttling narrow neck 252 goes into the mounting hole 241 through the mounting groove 242.

A lower surface of the upper protection ring 240 has a fitting surface matching with the oil bag 250 in order to prevent the upper part of the oil bag 250 from being extruded and broken under a high pressure.

The mounting hole 241 is formed in the center of the upper protection ring 240. The mounting groove 242 is also formed in the upper protection ring 240, and the exterior of the mounting groove 242 has a chamfer structure 243, so that the throttling narrow neck 252 of the oil bag 250 is more easily mounted in the mounting hole 241 of the upper protection ring.

The mounting hole 241 can ensure the intensity of the throttling narrow neck 252, and avoids breakage, prevents the throttling narrow neck 252 from deforming and ensures that the throttling narrow neck 252 of the oil bag 250 is always opened, thereby ensuring the effectiveness of the washing machine foot.

A part of the upper protection ring, in contact with the oil bag, has a consistent shape with the oil bag.

The upper protection ring and the chamber of the adjusting foot forms a relatively sealed space, by which the oil bag set inside is protected, so that the breakage and damage of the oil bag are effectively prevented.

The oil bag 250 comprises the opening 251, the throttling narrow neck 252 and the corrugated structure 253, the oil bag 250 internally accommodates the hydraulic medium therein. Preferably, the hydraulic medium is hydraulic oil.

The oil bag 250 is made of an oil-proof elastomer material, such as nitrile rubber, acrylate rubber, silicone and the like.

The oil bag 250 is in a working state of compressing and extending up and down and in order to improve the reliability and prolong the service life, the main body of the oil bag 250 is provided with the corrugated structure 253.

The oil bag 250 fits to a space of the adjusting foot 300 and a space of the upper protection ring 240, and only there is a certain interval at a position of the corrugated structure 253.

According to the washing machine foot of this embodiment, the mounting of the flexible assembly 200 is limited to mainly avoid instability caused by rotation of the washing machine foot in an automatic leveling process. Therefore, further, according to the washing machine foot of this embodiment, the movement of the adjusting foot is also limited, and so that the adjusting foot only moves up and down and does not rotate, thereby ensuring the stability of the leveling process. Specifically:

In this embodiment, guide limiting grooves 501 are formed in the inner wall of the jacket 500, guide limiting blocks 302 are arranged on an outer wall of the adjusting foot 300, and the guide limiting blocks 302 are limited in the guide limiting grooves 501 and axially slide along the guide limiting grooves 501.

The jacket 500 has the guide limiting grooves 501 so as to limit the adjusting foot 300 only to move up and down inside and not to rotate circumferentially, thereby preventing the rotation of the adjusting foot 300 in the jacket 500. The bottom of each guide limiting groove 501 is provided with a stopping part 507, and the stopping parts 507 match with the corresponding guide limiting blocks 302 protruding from the circumference of the adjusting foot 300, thereby preventing the adjusting foot 300 from dropping out of the jacket 500.

In this embodiment, an elastic washer 400 is arranged on the outer side of a bottom wall of the jacket 500. Reinforcing fitting grooves are formed in the bottom wall of the jacket 500, reinforcing fitting ribs 401 matching with the reinforcing fitting grooves are arranged on an upper surface of the elastic washer 400, and a lower surface of the elastic washer 400 is partially recessed to form a damping rib 402.

Preferably, the elastic washer 400 is a rubber washer. In order to reinforce the connection intensity between the adjusting foot 300 and the rubber washer, the reinforcing fitting grooves are formed in the bottom of the adjusting foot 300, the rubber washer has the reinforcing fitting ribs 401. Preferably, the rubber washer is integrally formed on the adjusting foot 300 by injection molding. Preferably, some recessed patterns are arranged at a part of the rubber washer in contact with the ground, to form the damping rib 402 to improve friction damping between the foot and the ground and prevent the washing machine from generating displacement caused by vibration.

In this embodiment, an assembling method for the washing machine foot is further provided, and comprises the following steps:

the jacket 500 being used as a reference;

1) the adjusting foot 300 with the rubber washer is put into the jacket 500 through the opening of the upper end of the jacket 500;

it should be noted that the guide limiting blocks 302 of the adjusting foot 300 must match with the guide limiting grooves 501 of the jacket 500;

2) the throttling narrow neck 252 of the oil bag 250 is mounted in the upper protection ring 240, the opening of the oil bag 250 receives a protrusion part of the oil press plate 220 and is placed in the sealing groove 223, the press plate 230 presses the opening of the oil bag 250, and screws or bolts penetrate through the limiting plate mounting holes 212, the oil press plate mounting holes 222 and the press plate mounting holes 231, so that the oil bag 250, the upper protection ring 240, the press plate 230, the oil press plate 220 and the limiting plate 210 form the flexible assembly 200; and the flexible assembly 200 is placed in the hollow chamber 301 of the adjusting foot 300;

3) the limiting plate 210 of the flexible assembly 200 is mounted in the jacket 500), the lower part of the limiting plate 210 is limited by the limiting grooves 502, and the circumference of the limiting plate 210 is limited by the limiting claws 211 and the limiting grooves 502; and 4) the circlip 101 is placed in the ring groove 505 of the jacket 500, and the flexible assembly 200 does not move relative to the jacket 500 in the vertical direction and the circumference direction, so that the flexible assembly 200 and the jacket 500 are fixed together.

The assembly of the washing machine foot is completed, which has high assembly efficiency and is simple and convenient, and the components being subject to stress are all made of sheet metals, thereby having high reliability.

In this embodiment, a washing machine comprising the above washing machine feet with the automatic leveling function is also provided. The washing machine comprises a casing and a plurality of the washing machine feet mounted at the bottom of the casing, wherein the hydraulic medium filling the inside of the washing machine feet flows between the washing machine feet to implement leveling.

In this embodiment, a preferred factory setting of the washing machine is that: heights of the four washing machine feet are consistent; if the washing machine is randomly placed on an uneven ground, the four washing machine feet bear different pressures according to uneven conditions of the bottom, and then lengths of the adjusting feet pressed into the jackets are different, so that the automatic leveling of the washing machine is implemented.

The above embodiments should be further described as follows.

1. In the embodiments of the present invention, the feet communicate with each other in a pairwise manner, the number (N is larger than or equal to 2) of the feet may be three or more, N≥2. Preferably the number is two, and when the number of the feet is two, the lowest cost and better effects can be achieved.

In the embodiments of the present invention, four ports of a communication device 15 are respectively connected with the four feet, and it can be deduced that if a communication device 15 which has three, five, six and N ports is used, the ports of the communication device 15 are respectively connected with three, five, six and N feet. The above-mentioned embodiments merely describe that a most suitable number of the ports is four under the condition that the function is implemented so as to control the costs to be the lowest.

2. In the embodiments of the present invention, by taking a drum washing machine for example, the principle and the method for implementing the automatic leveling of the drum washing machine are explained, and it is easy to be associated that the present invention can be applied to pulsator washing machines.

3. In the embodiments of the present invention, by taking a washing machine for example, the principle and the method for implementing the automatic leveling of the washing machine are explained, and it is easy to be associated that the present invention can be applied to household appliances, such as refrigerators, freezers, dish washing machines and the like.

Figure 9:
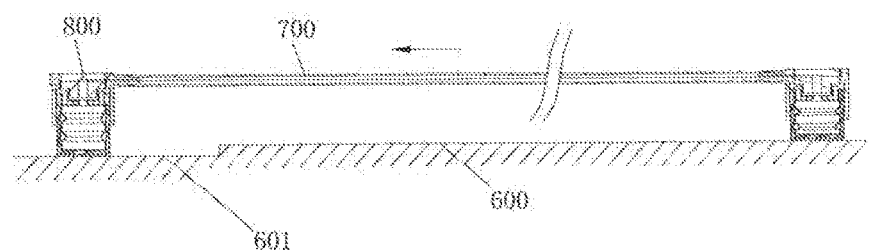
FIG. 9 is a schematic diagram of a leveling principle of a washing machine foot with an automatic leveling function according to an embodiment of the present invention.

FIG. 9 specifically describes the leveling principle. When the washing machine is mounted, uneven ground 600 causes different horizontal heights of the different washing machine feet 800, and a washing machine foot 800 located at a ground recess 601 is located at a low place. It can be known that a washing machine foot 800 at a high place firstly bears the weight of the washing machine and bear a large part of the weight, and the washing machine foot 800 at a low place becomes failure of support or bears a small part of the weight.

The adjusting foot 300 of the washing machine foot 800 at the higher place moves upwards under a large pressure, so that the height of the whole washing machine foot at the higher place is reduced, the volume of the hollow chamber of the oil bag 250 filled with the hydraulic oil is compressed and reduced. The hydraulic oil is forced to enter a throttling hole or a valve hole and then to enter the washing machine foot at the low place through the high-pressure oil pipes 700, the oil bag 250 of the washing machine foot at the low place has more and more hydraulic oil, and then the oil bag 250 expands to push the adjusting foot 300 to extend.

When the washing machine foot at the high place is the same hydraulic pressure as the washing machine foot at the low place, the hydraulic oil does not flow in the high-pressure oil pipes 700, the positions of the adjusting feet are not changed relative to the base plate of the washing machine, and automatic adjustment of the washing machine feet is completed.

In washing or drying process of the machine washing, the hydraulic oil further can slowly flow to carry out the automatic leveling, so that vibration noise of the washing machine is largely reduced.

In the embodiments, the height-pressure oil pipes 700 are connected with the oil nipples 221 of the washing machine feet 800.

What described above are only preferred embodiments of the present invention, but are not intended to limiting the scope of the present invention in any forms. Although the present invention has been disclosed in terms of preferred embodiments, it is not limited thereto. Without departing from the scope of the technical solution of the present invention, any persons skilled in the present invention can make equivalent embodiments with various alterations and modifications as equivalent variations by utilizing the above-mentioned technical contents. However, without departing from the contents of the technical solution of the present invention, any simple changes, equivalent variations and modifications made according to the technical essence of the present invention shall all be covered within the scope of the technical solution of the present invention.

The invention claimed is:

1. Washing machine foot with automatic leveling function, comprising:
   a jacket;
   an adjusting foot, which is arranged in the jacket and moves axially relative to the jacket;
   and a flexible assembly, which is arranged in the adjusting foot and is used for accommodating a hydraulic medium;
   one end of the flexible assembly is mounted in the jacket in a limiting manner, and another end of the flexible assembly is a telescopic end acting on the adjusting foot;
   and the telescopic end of the flexible assembly extends and contracts under action of the hydraulic medium to drive the adjusting foot to move axially, thereby implementing automatic leveling;
   wherein the jacket comprises a jacket body with a hollow passage, the adjusting foot is arranged in the hollow passage of the jacket body in an axially slidable manner, and one end of the adjusting foot extends out of the hollow passage of the jacket body;
   one end of the jacket body is opened and flanges outwards an outer side of the hollow passage form a jacket plane, and the jacket plane fits to a base plate of the washing machine and is fixedly connected with the base plate through connectors.

2. The washing machine foot with automatic leveling function according to claim 1, wherein
   the flexible assembly comprises an oil press plate, a press plate and an oil bag, and an opening of the oil bag is in sealed connection with a lower wall of the oil press plate through the press plate;
   an oil nipple is arranged on one side of the oil press plate, an oil hole for allowing the hydraulic medium in the oil bag to flow in is formed in the lower wall of the oil press plate, and an oil passage for communicating the oil nipple with the oil hole is formed in the oil press plate;
   the oil press plate is mounted at one end of the jacket plane of the jacket body in a limiting manner, and the oil bag is arranged in the jacket and comes into contact with an inner wall of the jacket.

3. The washing machine foot with automatic leveling function according to claim 2, wherein
   the flexible assembly further comprises a limiting plate,
   the limiting plate comprises a plurality of protruded limiting claws, and limiting grooves matching with the limiting claws to implement limiting are formed in the jacket body;
   and the limiting plate, the oil press plate and the press plate are fixedly connected to limit the circumferential rotation of the flexible assembly in the adjusting foot.

4. The washing machine foot with automatic leveling function according to claim 2, wherein
   the oil bag comprises a corrugated structure capable of stretch, a throttling narrow neck and an opening, the throttling narrow neck communicates with the corrugated structure, and the opening is located at an end of the throttling narrow neck;
   the flexible assembly further comprises an upper protection ring, a mounting hole for allowing the throttling narrow neck to pass is formed in a center of the upper protection ring, a mounting groove is formed in the upper protection ring, one end of the mounting groove is opened and across the mounting hole, and another end of the mounting groove is opened in a side wall of the upper protection ring;
   the throttling narrow neck goes into the mounting hole through the mounting groove.

5. The washing machine foot with automatic leveling function according to claim 1, further comprising,
   an axial limiting device, wherein the axial limiting device is arranged in the jacket, one side of the axial limiting device is limited by the base plate of the washing machine, and another side acts on the flexible assembly for limiting an axial movement of the flexible assembly.

6. The washing machine foot with automatic leveling function according to claim 5, wherein the axial limiting device is a circlip with an annular shape and a gap, a ring groove is formed in the inner wall of the jacket, and the circlip is clamped in the ring groove and is located above the limiting plate of the flexible assembly.

7. The washing machine foot with automatic leveling function according to claim 6, wherein a limiting bulge is arranged on the upper surface of the circlip in a protrusion manner, and a hole for allowing operations of a tool is formed in the circlip.

8. The washing machine foot with automatic leveling function according to claim 1, wherein
a guide limiting groove is formed in the inner wall of the jacket, a guide limiting block is arranged on an outer wall of the adjusting foot, and the guide limiting block is limited in the guide limiting groove and axially slide along the guide limiting groove;
an elastic washer is arranged on the outer side of a bottom wall of the adjusting foot, a reinforcing fitting groove is formed in the bottom wall of the adjusting foot,
a reinforcing fitting rib matching with the reinforcing fitting groove is arranged on an upper surface of the elastic washer, and a lower surface of the elastic washer is partially recessed to form a damping rib.

9. The washing machine foot with automatic leveling function according to claim 1, further comprising,
an axial limiting device, wherein the axial limiting device is arranged in the jacket, one side of the axial limiting device is limited by the base plate of the washing machine, and another side acts on the flexible assembly for limiting an axial movement of the flexible assembly.

10. The washing machine foot with automatic leveling function according to claim 2, further comprising,
an axial limiting device, wherein the axial limiting device is arranged in the jacket, one side of the axial limiting device is limited by the base plate of the washing machine, and another side acts on the flexible assembly for limiting an axial movement of the flexible assembly.

11. The washing machine foot with automatic leveling function according to claim 3, further comprising,
an axial limiting device, wherein the axial limiting device is arranged in the jacket, one side of the axial limiting device is limited by the base plate of the washing machine, and another side acts on the flexible assembly for limiting an axial movement of the flexible assembly.

12. The washing machine foot with automatic leveling function according to claim 4, further comprising,
an axial limiting device, wherein the axial limiting device is arranged in the jacket, one side of the axial limiting device is limited by the base plate of the washing machine, and another side acts on the flexible assembly for limiting an axial movement of the flexible assembly.

13. The washing machine foot with automatic leveling function according to claim 1, wherein,
a guide limiting groove is formed in the inner wall of the jacket, a guide limiting block is arranged on an outer wall of the adjusting foot, and the guide limiting block is limited in the guide limiting groove and axially slide along the guide limiting groove;
an elastic washer is arranged on the outer side of a bottom wall of the adjusting foot, a reinforcing fitting groove is formed in the bottom wall of the adjusting foot,
a reinforcing fitting rib matching with the reinforcing fitting groove is arranged on an upper surface of the elastic washer, and a lower surface of the elastic washer is partially recessed to form a damping rib.

14. The washing machine foot with automatic leveling function according to claim 2, wherein
a guide limiting groove is formed in the inner wall of the jacket, a guide limiting block is arranged on an outer wall of the adjusting foot, and the guide limiting block is limited in the guide limiting groove and axially slide along the guide limiting groove;
an elastic washer is arranged on the outer side of a bottom wall of the adjusting foot, a reinforcing fitting groove is formed in the bottom wall of the adjusting foot,
a reinforcing fitting rib matching with the reinforcing fitting groove is arranged on an upper surface of the elastic washer, and a lower surface of the elastic washer is partially recessed to form a damping rib.

15. The washing machine foot with automatic leveling function according to claim 3, wherein
a guide limiting groove is formed in the inner wall of the jacket, a guide limiting block is arranged on an outer wall of the adjusting foot, and the guide limiting block is limited in the guide limiting groove and axially slide along the guide limiting groove;
an elastic washer is arranged on the outer side of a bottom wall of the adjusting foot, a reinforcing fitting groove is formed in the bottom wall of the adjusting foot,
a reinforcing fitting rib matching with the reinforcing fitting groove is arranged on an upper surface of the elastic washer, and a lower surface of the elastic washer is partially recessed to form a damping rib.

16. The washing machine foot with automatic leveling function according to claim 4, wherein
a guide limiting groove is formed in the inner wall of the jacket, a guide limiting block is arranged on an outer wall of the adjusting foot, and the guide limiting block is limited in the guide limiting groove and axially slide along the guide limiting groove;
an elastic washer is arranged on the outer side of a bottom wall of the adjusting foot, a reinforcing fitting groove is formed in the bottom wall of the adjusting foot,
a reinforcing fitting rib matching with the reinforcing fitting groove is arranged on an upper surface of the elastic washer, and a lower surface of the elastic washer is partially recessed to form a damping rib.

17. The washing machine foot with automatic leveling function according to claim 5, wherein
a guide limiting groove is formed in the inner wall of the jacket, a guide limiting block is arranged on an outer wall of the adjusting foot, and the guide limiting block is limited in the guide limiting groove and axially slide along the guide limiting groove;
an elastic washer is arranged on the outer side of a bottom wall of the adjusting foot, a reinforcing fitting groove is formed in the bottom wall of the adjusting foot,
a reinforcing fitting rib matching with the reinforcing fitting groove is arranged on an upper surface of the elastic washer, and a lower surface of the elastic washer is partially recessed to form a damping rib.

18. The washing machine foot with automatic leveling function according to claim 6, wherein
a guide limiting groove is formed in the inner wall of the jacket, a guide limiting block is arranged on an outer wall of the adjusting foot, and the guide limiting block is limited in the guide limiting groove and axially slide along the guide limiting groove;

an elastic washer is arranged on the outer side of a bottom wall of the adjusting foot, a reinforcing fitting groove is formed in the bottom wall of the adjusting foot, a reinforcing fitting rib matching with the reinforcing fitting groove is arranged on an upper surface of the elastic washer, and a lower surface of the elastic washer is partially recessed to form a damping rib.

19. A washing machine comprising the washing machine foot with automatic leveling function according to claim 1, wherein the washing machine comprises a casing, a plurality of the washing machine feet mounted at a bottom of the casing, and a hydraulic medium provided inside the washing machine feet flowing between the washing machine feet to implement leveling.

* * * * *